Figure 2A:
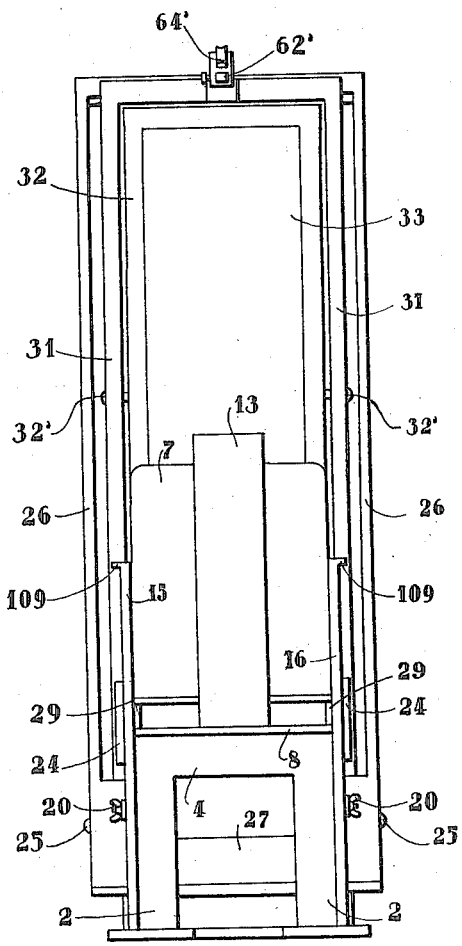

M. O. ROSSELLÓ.
APPARATUS FOR HYGIENIC, MEDICAL, AND ORTHOPEDIC GYMNASTICS.
APPLICATION FILED OCT. 14, 1912.
1,164,217.
Patented Dec. 14, 1915.
4 SHEETS—SHEET 1.
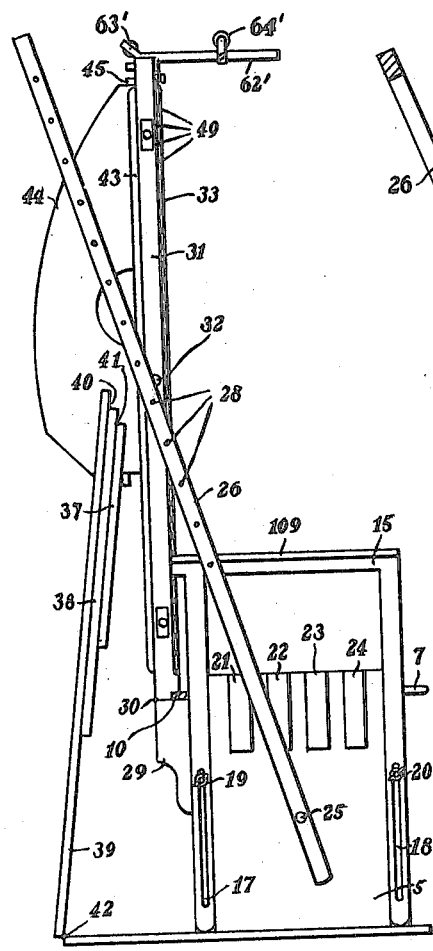
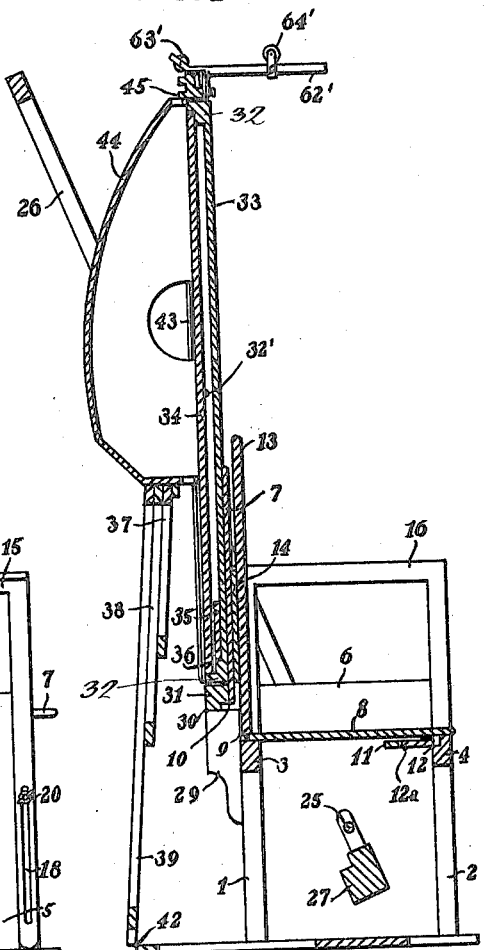
Witnesses—
Inventor
Miguel Ordinas Rosselló
by
Attorney.

M. O. ROSSELLÓ.
APPARATUS FOR HYGIENIC, MEDICAL, AND ORTHOPEDIC GYMNASTICS.
APPLICATION FILED OCT. 14, 1912.
1,164,217.   Patented Dec. 14, 1915.
4 SHEETS—SHEET 3.
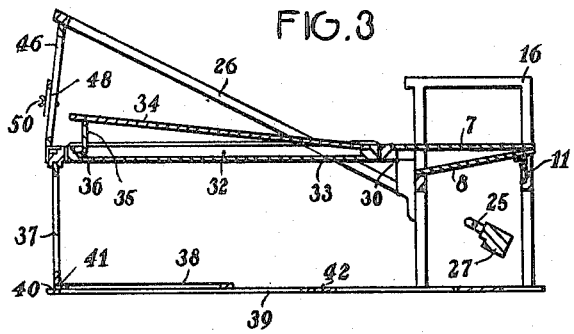
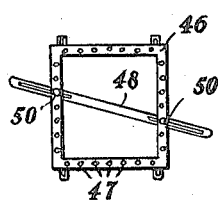
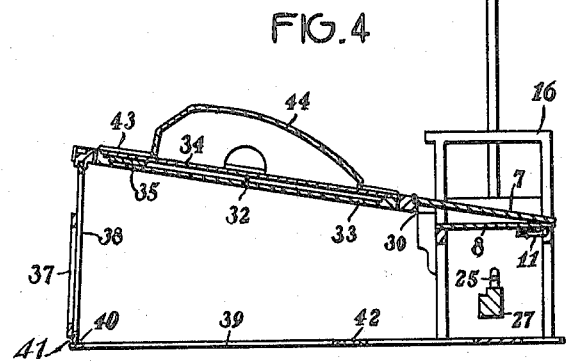
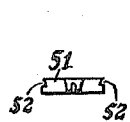 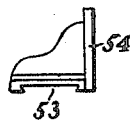  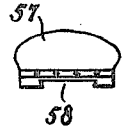
Witnesses—
Inventor
Miguel Ordinas Rosselló
by
Attorney.

M. O. ROSSELLÓ.
APPARATUS FOR HYGIENIC, MEDICAL, AND ORTHOPEDIC GYMNASTICS.
APPLICATION FILED OCT. 14, 1912.
1,164,217.
Patented Dec. 14, 1915.
4 SHEETS—SHEET 4.
FIG.10  FIG.11   FIG.12   FIG.13
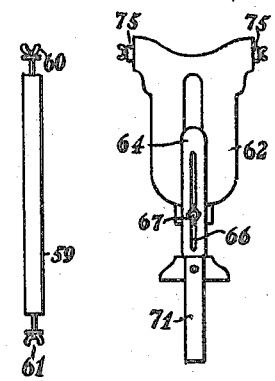
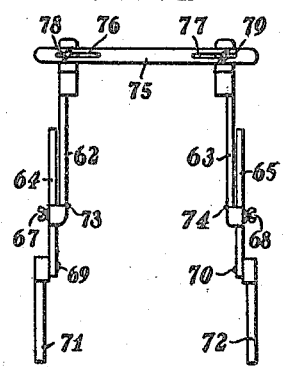
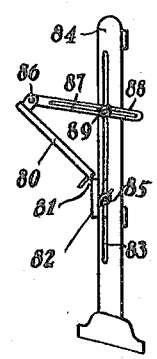
FIG.14   FIG.15
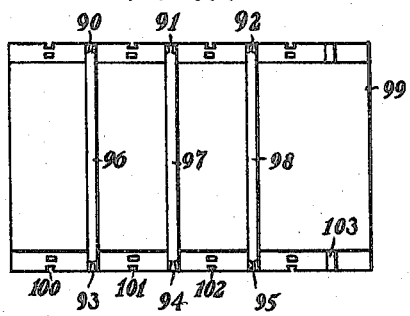
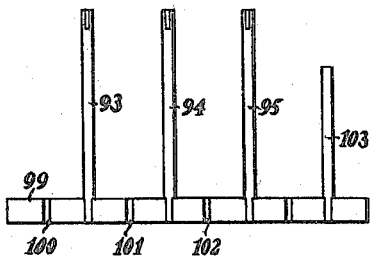
FIG.16
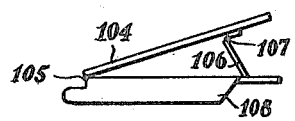
FIG.17   FIG.18
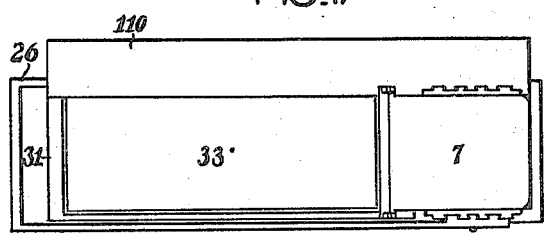
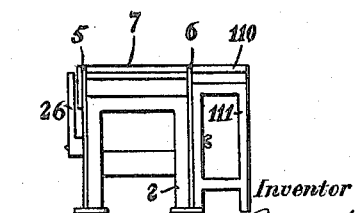
Witnesses—
Stanley Wood
H. W. Blake
Inventor
Miguel Ordinas Rosselló
by
W. E. Covey
Attorney.
COLUMBIA PLANOGRAPH CO., WASHINGTON, D. C.

UNITED STATES PATENT OFFICE.

MIGUEL ORDINAS ROSSELLÓ, OF BARCELONA, SPAIN.

APPARATUS FOR HYGIENIC, MEDICAL, AND ORTHOPEDIC GYMNASTICS.

1,164,217.  Specification of Letters Patent.  Patented Dec. 14, 1915.

Application filed October 14, 1912. Serial No. 725,705.

*To all whom it may concern:*

Be it known that I, MIGUEL ORDINAS ROSSELLÓ, a subject of the King of Spain, residing at 80 Rambla de Cataluña, Barcelona, Spain, have invented a certain new and useful Apparatus for Hygienic, Medical, and Orthopedic Gymnastics, of which the following is a specification.

The object of the present invention is an apparatus intended for gymnastic exercises for hygienic, medical and orthopedic purposes, and for taking and maintaining certain desired positions or attitudes. These exercises may be added to the positions mentioned without counteracting them but assisting them, by imparting simultaneously in favor of the person using the apparatus, the benefits both of the positions and the movements, which it is very difficult or even impossible to effect without the use of suitable mechanisms.

This apparatus is capable of domestic application owing to its relatively small size and sale price, as well as to its very simple operation.

The apparatus is constituted by a seat provided with a certain number of additional elements which are capable of taking certain relative positions so as to obtain in the same apparatus different arrangements suitable for the required attitudes and exercises.

In order to explain in a clear and complete manner the construction, operation and applications of this apparatus, reference is made to the accompanying drawings which represent by way of example a practical realization of the invention.

Figure 1 is a side view of the apparatus forming the seat. Fig. 2 is a vertical section. Fig. 2ª is a front view of the apparatus. Fig. 3 is one position of the apparatus in vertical section, for exercises and positions of the recumbent figure. Fig. 4 is another position of the apparatus in vertical section, with the curved back raised. Fig. 5 is a front elevation of a removable frame for use in connection with the apparatus. Fig. 6 illustrates a detail view of a cross member for mounting accessories of the apparatus. Figs. 7, 8, 9 and 10 are views of accessories capable of being mounted on the cross member referred to. Figs. 11 and 12 represent respectively in side and front view a method of sustaining the body of the patient in the seated position. Fig. 13 is a side view of a reading desk adapted to be used in connection with the apparatus. Figs. 14 and 15 represent in plan and side view a frame adapted to be used in connection with the apparatus. Fig. 16 represents in side view a reading desk adapted to be fitted on the arms of the bench. Figs. 17 and 18 represent, in plan and end view, the arrangement of an accessory which allows of utilizing the apparatus as a bed.

The apparatus is constituted (Figs. 1 and 2) by a bench formed by the uprights 1, 2 with the cross members 3, 4, and provided with ends 5, 6 to cover the sides. This bench is furnished with two seats 7, 8 provided so as to be employed as will be seen further on, and pivotally mounted at 9, 10 so as to be put in position or raised at will. Below the seat 8, a brace 11 pivotally mounted at 12 is intended to support the seat 8 when the latter is to remain in a raised position, according to requirements, in order that the seat 8 resting on the outer edge of the first, can take a horizontal position. The brace 11 is formed of two parts pivoted at 12ª, so that the seat can take three positions; two horizontal at different heights and one inclined.

The bench may carry a back 13 slidably mounted on the seat 7 when the latter is raised, and by means of the slide member 14 connected to the back, the latter can rest on the seat 8 (Fig. 2). It is also provided with arms 15, 16, the height of which can be regulated by means of slide members such as 17, 18 and tightening screws 19, 20. The rear extremity of the horizontal cross member of the arms 15, 16 serves as a stop to the framework 31 for the vertical position. On each side of the bench are provided projections 21, 22, 23, 24, so as to permit of fixing channels for the accessory device serving as a support in the seated position described later.

At each side of the bench, bars 26, 26 are pivoted at 25, 25 and they are connected above by a cross member so as to form as a whole a kind of framework oscillating on the pivots 25. These pivots simply serve to fix the framework in position on the seat by friction, or they are connected in the interior of the latter by a counter-poise 27 balancing the weight of the framework 26, which in this case oscillates freely. The bars 26, 26 are provided with a number of holes 28, (Fig. 1) for mounting the required accessories.

At the rear part of the bench a bracket 29 serves as a support to the hinges 30 of a framework 31 provided in the interior with another framework 32 pivoted at 32', the latter comprising on one side a smooth board 33 slightly larger than the framework 31, and on the other side grooves 43 to receive a curved back 44 which will be mentioned further on. The space of this side of the frame is covered by three boards; two side boards overlapping and a central board 34 which can take an inclined position resting on the brace 35 pivotally mounted at 36. In order to employ the board 33 or the face corresponding to the inclinable board 34, the whole device can be turned around the axis 32' inside the framework 31; it is fixed to the framework 31 by means of pins, bolts or the like.

Fig. 3 represents the position of the apparatus when the face corresponding to the board 34 is uppermost and the board is inclined due to the support of the rotated brace 35 which is pivoted at 36. In order to obtain this position of the apparatus the framework 31 should be rotated around 30, the latter resting on the supporting frames 37 or 38 according as the framework 31 is to rest in a horizontal position (Fig. 3) or inclined position (Fig. 4). The frames 37, 38 as well as the frame 39 are pivotally mounted at 40, 41, 42 in order that they may be raised or lowered at will.

In the position shown in Fig. 3, the framework 31 (Fig. 1) rotating with the whole interior portion except the inclinable board 34 forms a prolongation of the seat 7 and the latter takes a horizontal position, resting on the edge of the seat 8 which in its turn rests on the brace 11. In the position shown in Fig. 4 the seat 7 is inclined owing to the lowering of the brace 11 and the inclination of the seat 7 corresponding to the inclination of the frame 31 with its interior portion. Further in this Fig. 4, the inclinable board 34 has been lowered so as to allow the curved back 44 to pass.

This curved back 44 owing to its engagement in the grooves 43 (Fig. 2) can slide and be fixed at different distances from the extremities of the frame; when the apparatus is to be utilized in the position of a chair (Figs. 1 and 2) the back rests in the rear part held by the frame 39 which is raised for this purpose and by the cross-member 45. When the curved back 44 is withdrawn from the apparatus, the frame 31 is held directly by the frame 39 and for this purpose the frame 31 is provided with a notch or with a projection.

When it is desired to employ the board 33, if the apparatus is in the position of Figs. 3 and 4, the whole device of which it forms part is rotated around the axis 32 until the board comes above. The board can then be utilized either as a horizontal platform for lying on forming a prolongation of the seat 7 disposed horizontally or as an inclined platform for resting on the seat 7 being disposed also in the inclined position as is represented for example in Fig. 4. This same board 33 is further utilized as a large back for the bench 1, 2, by placing the frame 31 in the vertical position, as indicated in Fig. 1.

The frame 26 serves for a large number of different exercises and it can be employed as an inclined rest for the arms and for other uses, and for this purpose it may rest on another removable frame 46 (represented in front view in Fig. 5) which rests on and is fixed to the frame 31. The edge of the frame 46 is perforated with a number of holes 47 in order to allow of fixing a cross bar 48 by means of securing screws 50, 50 and slide members provided on the crossbar, the latter serving as a handle to be grasped by the gymnast so that he can take different attitudes and practise different exercises by means of the varied inclinations and heights which may be given to the cross member by the aid of the holes 47.

It is possible to dispense with the rotating disposition of the boards 33, 34 around the axis 32, and employ a single board, by using, for setting the curved back 44 and the other required accessories in position, any suitable fixing means, for example, holes 49 provided at the edge of the board 33 for fixing the different accessories. The same holes 49 serve for fixing a cross member 51 (Fig. 6, end view) provided with dove-tailed guides 52, 52, for the mounting of several accessories of the chair-apparatus. This cross member can be fixed at different heights in the platform 33 and for this purpose the lines of holes 49 have a suitable extent. The fixing of the cross member in position is effected by means of bolts, pins and the like. For example, one of the accessories capable of being mounted on the cross member is that shown in Fig. 7; it is constituted by a supporting bracket for the soles of the feet; the notch 53 serves for attaching it to the guides 52, 52 and the small shelf 54 is the support properly so called. Another accessory is that shown in Fig. 8; it consists of a cylinder 55 rotating between supports 56 with a notch for fixing similar to that 53 shown in the previous figure. This cylinder may have different diameters, and it is intended for the correction of dorsal and spinal irregularities and for other applications. The cushion 57 (Fig. 9) is another of the accessories which is capable of being attached to the cross member 51 by means of the notch 58.

Fig. 10 represents a fixed cylinder 59 which by means of the securing screws 60, 61, can be fixed at different heights in the holes 28 of the frame 26, this cylinder 59 serving as a purchase to the gymnast or for receiving straps or bandages and the like.

The upper extremity of the frame 31 may be surmounted by an arm 62' (Fig. 1) with pulleys 63', 64' for the passage of the cord connecting the suspension bandage (well known in medicine) to the weights provided at the other extremity.

Figs. 11 and 12 represent respectively in side and front view a method of sustaining the body of the patient in the seated position. It consists of the elements 62, 63 connected to the uprights 64, 65, to which they can be fixed at different heights by means of the slides 66 and the securing screws 67, 68. The uprights 64, 65 are mounted by means of pivots 69, 70 on rods 71, 72 intended to be fitted in the channels formed by the projections 21, 22, 23, 24 of the bench (Fig. 1). The elements 62, 63 are provided at the points at which they are attached to the uprights 64, 65 with hinges 73, 74, in such a manner that they have two oscillating movements simultaneously one around the axes 69, 70, the other perpendicular to this around the axes, 73, 74. In order to allow of employing different distances between the elements 62, 63 and to keep the distances constant as well as to connect the elements 62, 63 firmly together, two cross members 75, 75, one in front and the other at the rear, have been provided, fixed by means of slide members 76, 77 and securing screws 78, 79. This method of sustaining may be applied independently to the other seats of the present apparatus. Fig. 13 represents in side view a reading desk intended to be attached at its base to the frame 31, to the edges of the board 33 and fixed by means of the holes 49; it allows the patient to read comfortably in the position of lying on the back on the apparatus. This reading-desk is constituted by the platform 80 pivoted at 81 to the element 82 which can be fixed at different heights in the slide member 83 of the upright 84 by means of securing screws 85. Further the platform 80 is hinged at 86 to the braces 87 which can be fixed to the upright 84 by means of the slide members 83, 88, and the securing screws 89.

Figs. 14 and 15 represent in plan and side view a framing comprising several bridge-like members formed by vertical uprights 90, 91, 92, 93, 94, 95, and horizontal cross members 96, 97, 98, mounted on the platform 99 provided with several notches such as 100, 101, 102, in order that the uprights aforementioned can be disposed in different situations. The platform may further be provided with rods such as 103. The whole mechanism is intended to allow of fixing and attaching with straps or bandages around the body of the patient in order to force him to take certain required attitudes. The platform 99 may rest on the frame 31 and it rests above the board 33, being capable of sliding upward and vice-versa.

Fig. 16 represents in side view a reading-desk intended to be fitted on the arms 15, 16 of the bench, so that the patient may devote himself to reading, writing, playing, etc. in the seated position; this desk may also be employed as a rest for the legs in certain exercises and positions. It comprises the platform 104 hinged at 105 so as to have an inclination which may be regulated at will by means of the supporting brace 106 hinged at 107; the sides 108 serve for fitting the reading desk into the arms 15, 16 which are provided for that purpose with guides 109.

Finally, Figs. 17 and 18 represent in plan and end view, the arrangement of an accessory which allows of utilizing the apparatus as a bed. This accessory is constituted by a platform 110 provided with uprights 111 intended to be attached to the side of the bench by means of securing screws. The platform 110 rests at the level of the board 33 so as to form altogether a surface of sufficient size to serve as a bed.

In addition to the accessories described, many other accessories might further be applied to the apparatus for determined objects, without affecting the spirit of the invention.

The apparatus itself allows of different methods of construction and a great diversity of form in its integral parts without altering the principle.

What I claim as my invention and desire to secure by Letters Patent is:—

1. Apparatus for hygienic, medical and orthopedic gymnastics, comprising a board (33), said board having openings (49) at its edge adapted for the fixture of various accessory parts, a frame (32) into which said board is inserted, a rockable board (34) carried by said frame on its side distant from the board (33), a frame (31) which is rotatably fitted to the frame of the apparatus, and means to enable the said frame to assume various inclinations between the vertical and the horizontal position, substantially as described.

2. Apparatus for hygienic, medical and orthopedic gymnastics, comprising a board (33), said board having openings (49) at its edge adapted for the fixture of various accessory parts, a frame (32) into which said board is inserted, a rockable board (34) carried by said frame on its side distant from the board (33), a frame (31) which is rotatably fitted to the frame of the apparatus, said frame (31) having an auxiliary seat (7) resting upon the principal seat (8), and means by which it is adjustable to various inclinations, substantially as described.

3. Apparatus for hygienic, medical and orthopedic gymnastics, comprising a board (33), said board having openings (49) at its edge adapted for the fixture of various accessory parts, a frame (32) into which said board is inserted, a rockable board (34) carried by said frame on its side distant from the board (33), a frame (31) which is rotatably fitted to the frame of the chair, means to enable the said frame to assume various inclinations between the vertical and the horizontal position, and lateral arms (15) and (16) vertically adjustable on the frame of the apparatus, and stops for limiting the vertical position of the frame (31) in the forward direction, substantially as described.

4. Apparatus for hygienic, medical and orthopedic gymnastics, comprising a board (33), said board having openings (49) at its edge adapted for the fixture of various accessory parts, a frame (32) into which said board is inserted, a rockable board (34) carried by said frame on its side distant from the board (33), a frame (31) which is rotatably fitted to the frame of the apparatus, means to enable the said frame to assume various inclinations between the vertical and the horizontal position, a frame (26) rotatably mounted and capable of movement about the frame (31), and means consisting of a separate frame (46) whereby it may be connected therewith, substantially as described.

5. Apparatus for hygienic, medical and orthopedic gymnastics, comprising a board (33), said board having openings (49) at its edge adapted for the fixture of various accessory parts, a frame (32) into which said board is inserted, a rockable board (34) carried by said frame on its side distant from the board (33), a frame (31) which is rotatably fitted to the frame of the apparatus, means to enable the said frame to assume various inclinations between the vertical and the horizontal position, and three frames (37), (38) and (39) hinged one to the other and serving to support the frame (31) in its various positions, substantially as described.

In testimony whereof I have hereunto signed my name to this specification in the presence of two subscribing witnesses.

MIGUEL ORDINAS ROSSELLÓ.

Witnesses:
S. PONDULUMI,
NARCISA JABERT.

Copies of this patent may be obtained for five cents each, by addressing the "Commissioner of Patents, Washington, D. C."